United States Patent [19]
Taenzer

[11] 4,061,415
[45] Dec. 6, 1977

[54] NUTATING RADIATION DEFLECTING METHOD AND APPARATUS

[75] Inventor: Jon C. Taenzer, Palo Alto, Calif.

[73] Assignee: Sanford Research Institute, Menlo Park, Calif.

[21] Appl. No.: 702,273

[22] Filed: July 2, 1976

[51] Int. Cl.² .................. G02B 27/17; G01V 1/16; H04B 13/02; G10K 11/00

[52] U.S. Cl. ............................... 350/6; 350/285; 350/320; 358/112; 358/205; 340/5 MP; 73/620; 181/176

[58] Field of Search ............... 350/6, 7, 285, 320; 250/236, 203 R; 358/112, 205; 340/5 MP; 73/67.8 S; 181/176

[56] References Cited

U.S. PATENT DOCUMENTS

| | | | |
|---|---|---|---|
| 2,967,246 | 1/1961 | Ostergren | 250/236 |
| 3,752,559 | 8/1973 | Fletcher et al. | 250/203 R |
| 3,913,061 | 10/1975 | Green | 340/5 MP |
| 3,937,066 | 2/1976 | Green et al. | 340/5 MP |

*Primary Examiner*—Jon W. Henry
*Attorney, Agent, or Firm*—Victor R. Beckman

[57] ABSTRACT

There are disclosed radiation deflection method and means for controlling the direction of travel of radiation which is subject to refraction, such as light and sound radiation. The deflection method and means, which are particularly adapted for effecting a scanning motion of the radiation in one direction, include first and second generally counterrotating refracting wedges through which the radiation passes. The second wedge is mounted for rotation about a fixed axis and the first wedge is mounted for rotation about an axis which nutates about the fixed axis of rotation of the second wedge. Means are provided for rotating the first and second wedges in opposite rotary directions at equal angular displacements while simultaneously nutating said first wedge. For use with acoustic radiation a fluid filler medium is provided between the wedges, and a linear array of transducer elements is included over which the scanned compressional acoustic image field is swept by operation of the deflection system for converting the image field to an equivalent electrical signal. Novel wedge mounting and drive means are disclosed for the simultaneous rotation of the first wedge and nutational movement of the rotational axis thereof in the above described manner. The sum of the absolute amount of refraction of the radiation at the various interfaces of the system in passing through the system is minimized to substantially reduce mode conversion and aberration thereat.

31 Claims, 9 Drawing Figures

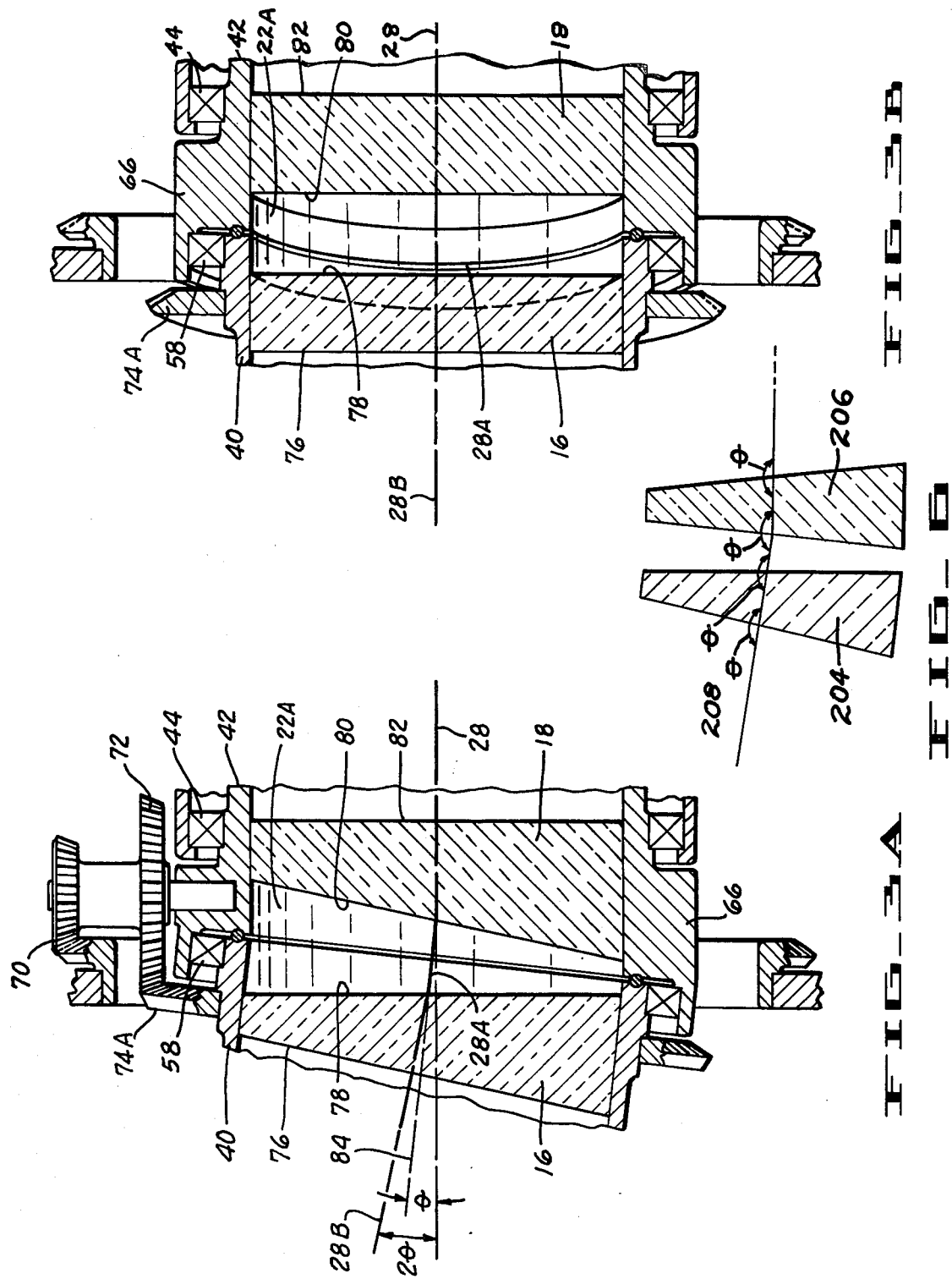

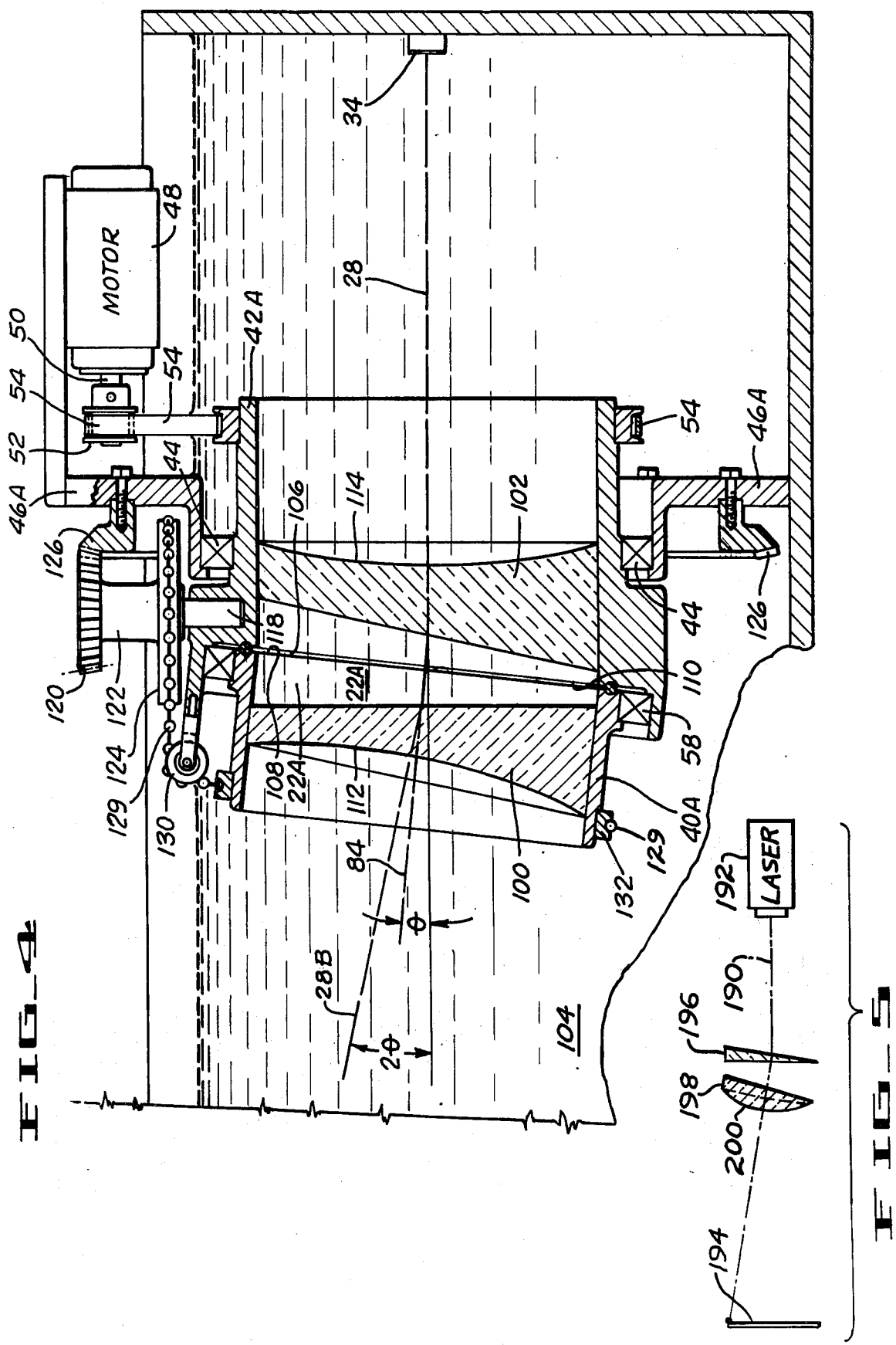

NUTATING RADIATION DEFLECTING METHOD AND APPARATUS

ORIGIN OF INVENTION

The invention described herein was made in the course of work under a grant or award from the Department of Health, Education and Welfare.

BACKGROUND OF INVENTION

Radiation deflecting systems employing counterrotating wedges, or prisms, adapted for use with various types of radiation subject to refraction are well known. For example, a scanning antenna utilizing four rotary prisms for use in a radar system is shown in U.S. Pat. No. 3,226,721 by R. V. Gould. Optical scanning devices, for use with light radiation, are shown in U.S. Pat. Nos. 1,647,631 and 2,975,668 by H. E. Ives and A. F. Eckel, respectively, and an acoustic imaging and image deflection system similar to the present disclosure is shown in the U.S. Pat. No. 3,913,061, issued Oct. 14, 1975, by Philip S. Green and assigned to the same assignee as the present invention, the subject matter of which patent specifically is incorporated herein by reference.

With many prior art arrangements a pair of counterrotating wedges are mounted in axial alignment and rotated in opposite rotational directions at the same rate of rotation whereby the wedges, located in the path of radiation, deflect the radiation to effect a generally linear scanning motion in one direction. For simultaneous image focusing and deflection a lens system is employed in conjunction with the deflecting means whereby the entire image is scanned or deflected. Problems of image distortion, radiation loss, and multiple internal reflections are encountered with such prior art arrangements. In particular, the angle of incidence at one or more of the refracting surfaces included in the system often is large whereby critical angle reflection, mode conversion (in the case of acoustical energy), aberration, and other such deleterious effects and phenomena are encountered or exacerbated by operation with large incident angles.

SUMMARY AND OBJECT OF INVENTION

An object of this invention is the provision of improved radiation scanning method and means of the counterrotating wedge type by which various deficiencies of the prior art such as mode conversion, aberration, critical angle reflection, and the like are substantially reduced and/or eliminated.

An object of this invention is the provision of an improved counterrotating wedge mounting and drive arrangement whereby one wedge is mounted for rotation in one direction about a fixed axis and another wedge is mounted for rotation in the opposite rotational direction about a movable axis which nutates about said fixed axis.

An object of this invention is the provision of a combination radiation focusing and image deflection method and apparatus which employs the refractive property of lenses and counterrotating wedge elements in which the sum of the absolute angle of bending of the radiation at the various element interfaces to obtain the desired image deflection is minimized thereby reducing image distortion and radiation losses in traveling therethrough.

An object of this invention is the provision of an improved combination ultrasonic image focusing and deflection system for focusing of an ultrasonic compressional wave image and cyclically displacing the image field past a line whereby the image may be converted by a linear transducer array to electrical signals for further signal processing, which focusing and deflection system functions with a minimum of aberration and mode conversion at interfaces between liquid filler and solid lens and wedge elements included therein.

The above and other objects and advantages of this invention are achieved by use of first and second generally counterrotating wedges through which the radiation to be deflected by refraction is directed. The second wedge is mounted for rotation about a fixed axis and the first wedge is mounted for rotation about a movable axis which nutates about the fixed axis. Additionally, the wedges are driven in opposite rotary directions at equal angular displacements. Obviously, radiation may pass in either direction through the wedges. For simultaneous image focusing and deflecting, the deflecting system is provided with focusing means such as focusing lenses or elements. In one such composite image focusing and deflecting system in which radiation from an object is directed first through the first deflecting wedge and then through the second deflecting wedge, the axis of accepted radiation is swept across a curved surface at the object, and the image from the system is recurrently swept past a line normal to the extended fixed axis of rotation of the second wedge. A linear transducer array may be located at said line for converting the radiation to electrical signals which may be further processed. Because the configuration of the space between the wedges changes upon rotation of the wedges, a fluid filler medium is located between the wedges. The system may be immersed in a surrounding fluid medium, and spaces, if any, between associated wedge and lens elements may be filled with a solid or a fluid. In some instances it is desirable to employ a fluid filler medium between the wedges with different refractive properties from the surrounding fluid. To separate the filler fluid from the surrounding fluid in such case, the wedges are mounted in cylindrical tubular housing members having adjacent parallel, oblique, ends between which rotary seal means are located to prevent leakage of fluid filler medium from the cavity formed between the wedges. The housing members are relatively rotatably mounted with the oblique housing ends in parallel relationship, and rotation of the housing for the first wedge is through a drive connection carried by the second wedge housing. The second wedge housing is rotatably driven about the fixed axis of rotation whereby the oblique housing end nutates about the fixed axis. The first housing moves with a combination nutating and rotating motion in which the resultant motion provides for a nodding, or oscillating movement of the radiation axis of the first wedge in a plane parallel to that containing the fixed axis. The angle through which the rotational axis of the first wedge nutates preferably is one half the maximum angle of deflection from the fixed axis of the image passing therethrough.

The above and other objects and advantages of the invention will become apparent from the following description taken in conjunction with the accompanying drawings.

BRIEF DESCRIPTION OF DRAWINGS

In the drawings, wherein like reference characters refer to the same parts in the several views:

FIG. 3A is a simplified longitudinal vertical cross-sectional view of the wedges shown in FIG. 1 showing acoustic paths and rotational axes, and FIGS. 3B, 3C and 3D are similar views but showing the wedges rotated 90°, 180° and 270°, respectively, from the position shown in FIG. 3A;

FIG. 4 is a simplified longitudinal vertical cross-sectional view, similar to FIG. 1, but showing a modified form of this invention utilizing different wedge/lens configurations and showing a modified drive means;

FIG. 5 is a simplified longitudinal sectional view of a beam deflecting system which also embodies this invention; and FIG. 6 is a simplified longitudinal sectional view of a pair of counterrotating wedges which provide for equal radiation deflection at the four wedge surfaces.

For purposes of illustration, the method and apparatus of my invention are shown included in acoustic systems in FIGS. 1-4, and in optical deflection systems in FIGS. 5 and 6. As noted above, there is a close analogy between reflection and refraction of optical and acoustic wave fronts at interfaces between regions of different refractive index, and acoustic refracting devices (e.g. lenses, wedges, prisms, prismatic lenses, etc.) and reflectors are designed in accordance with the same procedures used in optics. The wedges, lenses, and the like, included in the illustrated acoustic systems of FIGS. 1-4 simply may be designed for use in analagous optical systems without the exercise of invention. The term radiation as used hereinbelow, unless otherwise indicated, includes all forms of radiation subject to a change of direction of travel (i.e. refraction) on passing obliquely from one medium to another in which the velocity of propagation is different, such as electromagnetic radiation and sound waves.

Figure 1:
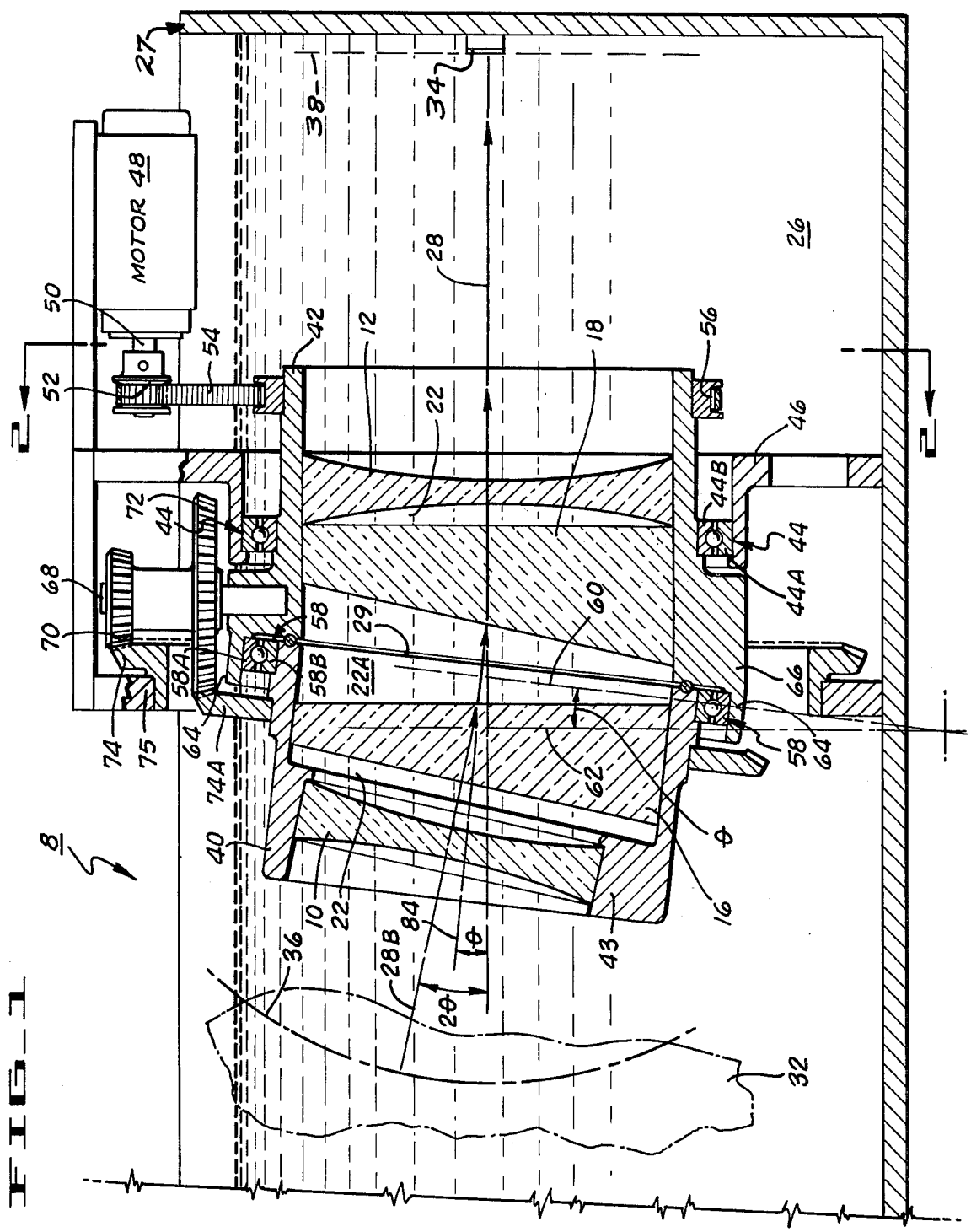
FIG. 1 is a longitudinal vertical cross-sectional view (taken along line 1—1 of FIG. 2) through an acoustic imaging and image deflection system illustrating one embodiment of the present invention.
Figure 2:
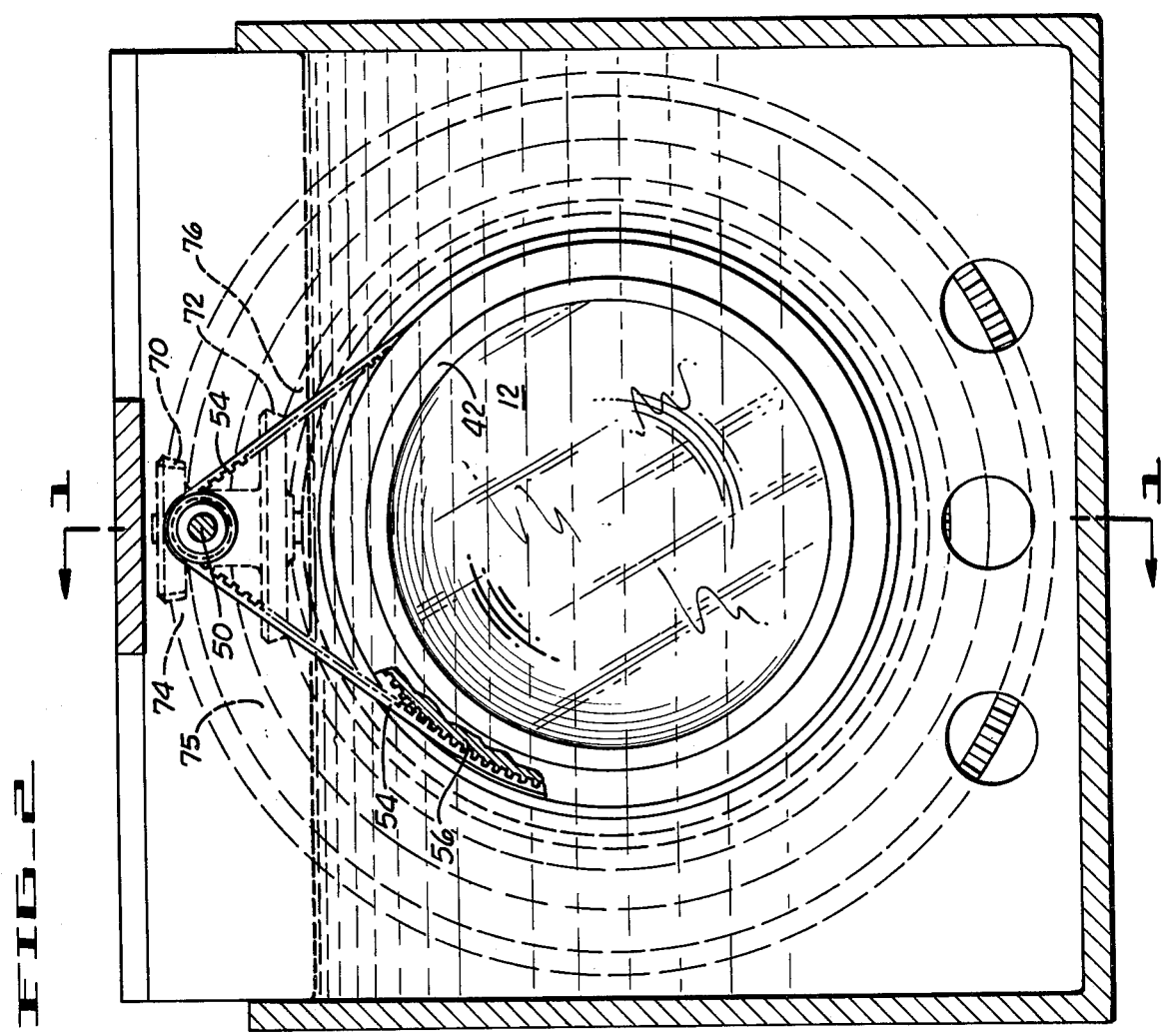
FIG. 2 is a simplified view taken substantially along line 2—2 of FIG. 1.

For simplicity, the first described composite acoustic imaging and deflecting system of FIGS. 1, 2 and 3 includes separate imaging and deflecting means. The system, for purposes of illustration, is shown included in an acoustic receiver 8. Focusing action, i.e. imaging, is provided by a pair of solid lens elements 10 and 12. The radiation axis 28B (that is, acoustic axis) of the lens element 10 oscillates up and down substantially in the plane containing the fixed acoustic axis 28 of the second lens 12. The lens elements are spaced apart and the novel radiation deflecting means comprising wedges 16 and 18 are located therebetween.

The illustrated lens elements 10 and 12 are spaced from the wedges 16 and 18, respectively, and a liquid filler medium 22 for the support of acoustic waves is located therebetween. Obviously, a solid of appropriate refractive index may be used in place of the liquid 22. A liquid filler medium 22A is provided between the two wedges 16 and 18 which may be of the same or different type as the liquid medium 22. The lens elements and wedges, with associated liquid filler medium, are immersed in a liquid medium 26, termed the surrounding medium, contained in a tank 27, which medium simply may comprise water, for example. If different liquid media 22A and 26 are employed, a rotary seal ring 29 is provided between the wedge housings to separate the medium 22A from the surrounding medium 26.

The object 32 under investigation is located within the liquid medium 26 and is insonified by an acoustic transmitting transducer, not shown, also suitably coupled to the object 32 as through the surrounding medium 26. The ultrasonic compressional wavefield from the insonified object 32 is coupled to the lens element 10 through the surrounding liquid medium and passes through the lens and wedge system of this invention. The received acoustic wave field may be of the transmitted or reflected type depending upon the relative positioning of the transmitting transducer and receiving lens system. In either case the directly received or reflected acoustic waves from the insonified object 32 are focused by the lens elements 10 and 12 for imaging of the wave field at a location to the right of the lens element 12, as viewed in FIG. 1. For purposes of illustration, a transducer 34 is shown at the end of the tank 27 opposite the object 32 and extending across the lens, or system, axis 28 to receive the focused acoustic image wave field. The transducer may comprise, for example, a linear array of piezo-electric elements individually responsive to the instantaneous field pressure thereat. The array is sensitive only to a very narrow line across the compressional acoustic image field from the lens element 12.

With the novel image deflection system the acoustic axis 28B for incident waves oscillates up and down (substantially in the plane of drawing FIG. 1) to vertically scan the insonified object 32, whereby the object surface 36 of the focusing system is sequentially detected by the transducer array 34. The transducer array is positioned at the image surface 38 for the lens system. As the incident lens 10 oscillates up and down a complete image field may be transformed by the line of transducer elements to electrical signals from which a visual characterization of the image surface may be produced as, for example, on the screen of a cathode ray tube.

The radiation deflecting wedges 16 and 18 may be made of the same or different material as the lens elements 10 and 12. For acoustic imaging and deflecting, polystyrene, or like material, often is employed because of its low sound absorption characteristics, i.e. low as compared to such materials as lucite. Also because of its low reflectivity in water, the use of polystyrene for lens elements 10 and 12 and wedge elements 16 and 18 is desirable. The lenses 10 and 12 and wedges 16 and 18 are located inside cylindrical shaped tubular housing members 40 and 42, respectively, integrally formed or separately provided at the lens and wedge peripheries. In the illustrated arrangement separate tubular housing members are shown within which the lenses and wedges are fixed as by a snug-fit, glue, or the like. Proper positioning of the lens 10 at the acoustic axis 28B is provided by the inclusion of a ring member 43 for mounting the lens within the housing 40. The wedge 18, through which the wave exits the deflecting system, is mounted for rotation about the fixed axis 28. To this end a conventional ball bearing 44 is provided having one race 44A seated inside an aperture formed in a supporting member 46 inside the tank 27, and second race 44B carried by the housing 42 so that the wedge 18 is free to rotate about the fixed axis 28.

Drive rotation of the wedge 18 is provided by a motor 48 having a motor shaft 50 connected to the lens housing 42 through a toothed pulley 52 and belt 54 arrangement. A toothed pulley groove 56 is formed about the outer perimeter of the housing 42 to receive the belt. Other toothed drive arrangements, such as a gear drive, may be used to provide a positive drive connection between the motor and wedge 18. For purposes of illustration only, a four-to-one drive ratio may be provided such that a motor 48 operated at 1800 revolutions per minute (rpm) rotates the wedge 18 at 450 rpm.

The housing 40 for the first wedge 16 is rotatably supported by the housing 42 for the second wedge 18 by means of a bearing 58. It will be seen that the bearing lies in a plane 60 extending at an oblique angle $\theta$ with a plane 62 normal to fixed rotational axis 28 whereby the bearing nutates about the axis 28 upon drive rotation of the wedge 18. The bearing 58, for purposes of illustration, has one race 58A carried by a ring 64 attached to an oblique flange 66 fixed to the housing 42. The associated race 58B is carried by the housing 40 for the wedge 16. As will become apparent hereinbelow, the nutational angle $\theta$ is selected to substantially equal one-half the angle of maximum deflection of the incident wave axis 28B.

The nutating wedge 16 is simultaneously rotated in a direction opposite to that of the wedge 18 at the same rotational speed. Various means for drive rotation of the wedge 16 are possible. In the embodiment shown in FIGS. 1 and 2 the drive means includes a shaft 68 attached to the housing 42 for the wedge 18 and extending radially outwardly from the rotational axis 28. Two relatively fixed gears 70 and 72 are rotatably supported on the shaft, with the gear 70 engaged with a bevel ring gear 74 attached to a wall 75 within the housing 27. It will be seen, then, that as the housing 42 is rotated, the gear 70 (and attached gear 72) is caused to rotate by reason of engagement of the gear 70 with the fixed gear 74.

The gear 72, which is attached to or formed with the gear 70 for rotation therewith, engages a bevel ring gear 74A affixed to the housing 40 for the first wedge 16 and lying in a plane parallel to the plane 60 of the bearing support 58. Upon rotation of the wedge 18 in one direction the wedge 16 is driven in an opposite rotational direction. By proper selection of gears a $-1$ to 1 gear ratio is provided in the drive connection between the wedges such that for every revolution of the wedge 18 in one rotational direction the wedge 16 is driven one complete revolution in the opposite rotational direction. It will be understood, then, that the wedges 16 and 18 are rotated in opposite rotational senses at precisely the same rotational speeds while the rotational axis for the wedge 16 nutates about the fixed axis 28.

Figure 3D:
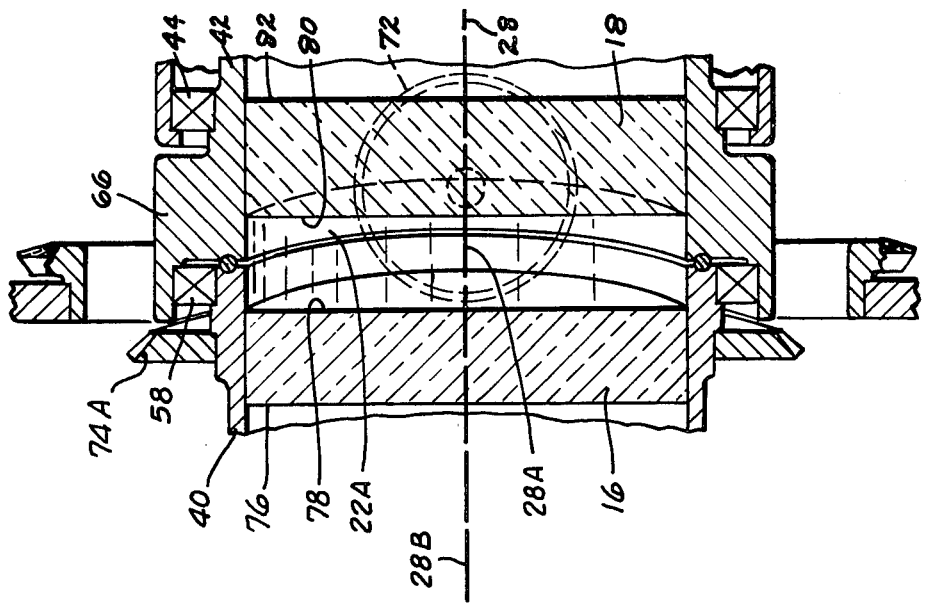

Image sweeping, or deflection, of an incident compressional wave field provided by the counterrotating wedges 16 and 18 now will be considered with reference to the simplified drawings shown in FIGS. 3A, 3B, 3C and 3D wherein the deflecting wedges without the focusing lenses are shown at four different rotary positions at 90° intervals. The bearing 58 rotatably connecting the wedges and the gear 74A are shown for disclosure of the same at different rotary positions. In FIG. 3A the wedges are shown in the same relative rotary position illustrated in FIG. 1, in which position the two wedges are oriented with their thinnest dimensions at the top and the thickest dimensions at the bottom. The surfaces forming the wedge angles of wedges 16 and 18 are identified by the reference characters 76 and 78, and 80 and 82, respectively. A wedge 22A of the filler fluid medium is formed between the inner facing surfaces 78 and 80 which wedge has its thickest dimension at the top and its thinnest dimension at the bottom. For purposes of illustration only, the wedge 18 is shown mounted within the housing 42 such that in all rotary positions of the wedges the outer face 82 of the wedge 18 is normal to the system axis 28 about about which the wedge 18 rotates; the acoustic and rotary axes of the wedge 18 being coincident along the central axis 28. Again, for purposes of illustration only, the surface 76 is normal to the acoustic axis 28B. At the surface 78 of the wedge 16 the propagation direction of the acoustic wave is shifted upwardly in an amount determined by the slope of the surface 78 and the relative refractive indices of the wedge material and the fluid medium 22A. In the illustrated arrangement, the selection of material, wedge angles, and the like, is such that in the maximum image deflection positions (shown in FIGS. 3A and 3C) the rotational axis 84 of the wedge 16 coincides with the radiation axis 28A (i.e. acoustic axis in this case) within the fluid medium 22A between the wedges 16 and 18. At the surface 80 at the interface of the fluid medium 22A and wedge 18 the acoustic image field again is shifted, or bent, in an upward direction in the same amount as provided at the surface 78 for travel along the radiation (acoustic) axis 28 of the wedge 18. In the illustrated arrangement, the surface 82 of the wedge 18 is normal to the acoustic axis 28 so that the illustrated emergent radiation at the axis travels across the interface between the wedge material and fluid filler medium 22 without changing direction. With the illustrated arrangement it will be seen then, that in the maximum deflection position shown in FIG. 3A no directional change is provided at the incident and emergent surfaces 76 and 82 of the deflection system wedges 16 and 18, respectively, and that equal bending is provided at the facing surfaces 78 and 80 of the wedges for axially entering waves. Obviously, the wedges 16 and 18 could be mounted within the housing members 40 and 42 such that the incident and emergent surfaces 76 and 82 are at an angle which is not normal to the acoustic axes 28B and 28, respectively. For example, they may be arranged for equal refraction of such rays in the same direction at all four surfaces 76, 78, 80 and 82 in the maximum deflection position of the wedges, in which case refraction at the various interfaces is minimized for reduced mode conversion and aberration. It will be understood, however, that the invention is not limited to such an arrangement. Often the wedge and lens construction is symmetrical about the rotary seal plane such that the net deflection by each wedge is equal. Again, such symmetry is not required, and any desired combination of wedges, lenses and filler materials may be employed to best suit the particular application.

In FIG. 3B the wedges 16 and 18 are shown rotated 90° in counterclockwise and clockwise directions, respectively, from the FIG. 3A showing, as viewed from the left of the drawing. In the illustrated 90° position the outer wedge surfaces 76 and 82 now are parallel, as are the inner facing wedge surfaces 78 and 80. The medium 22A between the wedges now is in the form of a slab lying in a plane extending at an oblique angle with the system axis 28. The propagation direction of an incident wave parallel to the axis 28 is unshifted at the incident surface 76 of the wedge 16, is shifted inwardly from the plane of the drawing at the surface 78 of the wedge 16, and then is bent outwardly at the surface 80 of the wedge 18 by the same angular amount so as to emerge from the wedge 18 normal to the wedge surface 82. It will be apparent, then, that an incident wave field traveling parallel to the axis 28 emerges from the wedge 18 in a parallel direction of travel but laterally displaced therefrom. However, since the deflecting wedges 16 and 18 are located between the lenses 10 and 12 of the imaging system, such lateral displacement has no affect upon the image when the instantaneous object and image planes are located at the focal plane of each lens. Where the novel deflection system is employed without such focusing means the displacement may be minimized as by minimizing the spacing between the wedges.

Figure 3C:
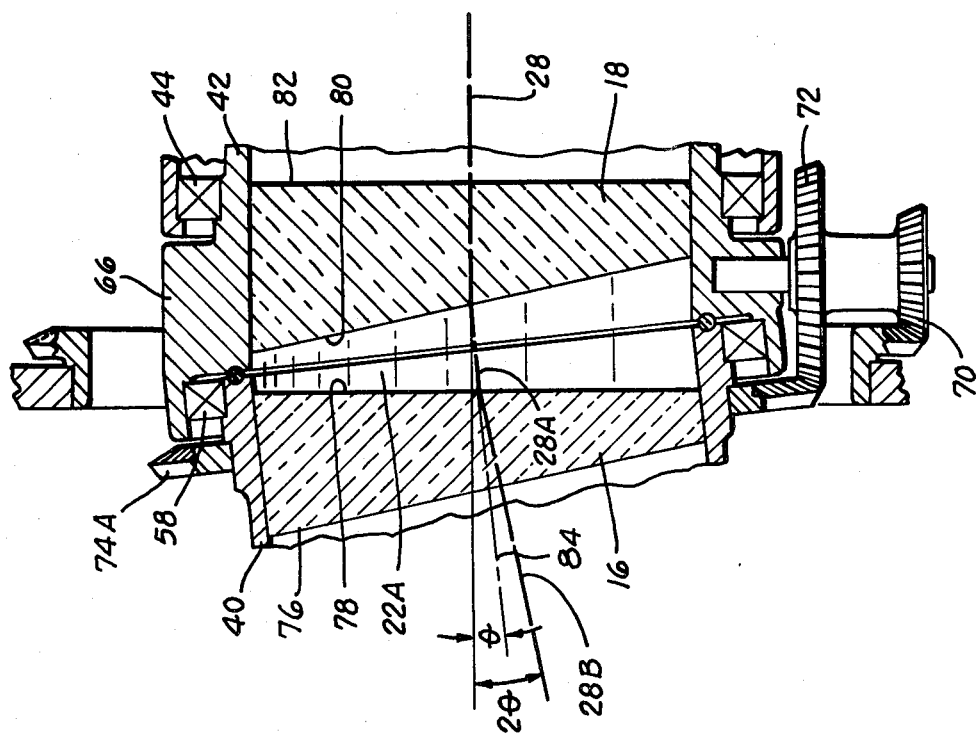

In FIG. 3C each of the wedges is shown rotated 180° from the 0° position shown in FIG. 3A such that the thickest dimensions of wedges 16 and 18 are at the top, and the thinnest dimensions are at the bottom. Incident radiation entering along the axis 28B first is bent downwardly at the wedge surface 78 by an angle of $\theta$ and then is bent downwardly again by the same amount at the surface 80 of wedge 18. No change in direction of such an incident wave is experienced by the incident and emergent waves at the surfaces 76 and 82 since wave travel is normal to such surfaces. In this position the wave is deflected downwardly at a miximum angle of $2\theta$, with the rotational axis 84 of the wedge 16 inclined downwardly at an angle of $\theta$.

With the wedges counterrotated to the 270° position shown in FIG. 3D the two outer wedge surfaces 76 and 82 again are parallel, as are the inner facing surfaces 78 and 80. Now, however, the sheet, or slab, of intermediate fluid medium 22A between wedges forms an equal, but opposite oblique angle with the system axis from that existing at the 90° position shown in FIG. 3B. With continued counter-rotation, the wedges are returned to the 0° relative rotary position shown in FIG. 3A.

As wedges 16 and 18 are counterrotated at the same speed about fixed axis 28 and movable axis 84, which nutates about the fixed axis, the angle between the inner faces 78 and 80 changes from a maximum (FIG. 3A) for maximum upward deflection of the incident wave, to zero (FIG. 3B), then to a maximum in the opposite direction (FIG. 3C). As the wedges are further rotated the angle again is reduced to zero (FIG. 3D) and then returns to a maximum at the starting position (360° rotation). The combination of the two counterrotating wedges effectively presents a variable angle fluid medium wedge 22A between the wedges 16 and 18 by means of which an incident compressional acoustic image field is effectively scanned up and down and, by means of associated lenses, is imaged at an image plane containing a line perpendicular to the system axis 28 and lying in a plane containing said axis along which line the transducer array 34 (FIG. 1) is positioned. The scanning action takes place once in each direction for each full rotation of the wedges 16 and 18 without rotary displacement and substantially without lateral displacement.

Advantages of such an arrangement include the fact that maximum angular deflection of the wave is provided with a minimum of bending, or deflection, thereof at the individual interfaces included in the system. As noted above, in the illustrated arrangement, no bending of normal incident wave fields occurs at the outer wedge faces 76 and 82, and equal bending occurs at the inner facing wedge surfaces 78 and 80. Also, as noted above, the wedges may be arranged for equal bending at all four wedge surfaces in the maximum deflection position. In FIG. 6, to which reference is made, a pair of counterrotating wedges 204 and 206 are shown for deflecting radiation, such as a beam 208. The wedges 204 and 206 are mounted for rotation about fixed and nutating axes, respectively, as by use of mounting and drive means of the type shown in FIGS. 1–3, for example, and bending of radiation 208 at all four wedge surfaces (in the maximum radiating deflection position) is shown. In particular, equal bending at the four wedge surfaces is shown such that maximum total bending may be provided with minimum bending at individual interfaces. Aberration is substantially reduced where the angle of incidence of the wave at the various interfaces within the system is maintained at a minimum as in the present invention.

The invention having been described in detail in accordance with the requirements of the Patent Statutes, various other changes and modifications will suggest themselves to those skilled in art. For example, prismatic lenses, rather than separate wedges and lenses, may be employed as shown, for example, in FIG. 4. Simultaneous focusing and deflecting is provided by prismatic lenses 100 and 102 thereby eliminating the need for the separate focusing lenses 10 and 12 of the FIGS. 1, 2 and 3 arrangement. The use of separate lenses and wedges simplified the showing and operation of the system and for that reason were shown above. The composite focusing and deflection system shown in FIG. 4, which is employed in a surrounding liquid medium 104, also includes an annular seal 106 between the facing end walls 108 and 110 of the prism housings 40A and 42A to prevent leakage of the liquid medium 22A from between the prismatic lenses. Also, the outer faces 112 and 114 of the lenses 100 and 102 are curved to provide the necessary focusing action for any compressional image fields incident on the lens element 100. Again, as with the FIGS. 1 through 3 arrangement, the elements 100 and 102 are of the same design, and the operation is the same as described above except that focusing is provided by the prismatic lens elements 100 and 102 rather than by separate lens elements.

In FIG. 4 a modified drive arrangement for counterrotation of the lens elements 100 and 102 also is shown which may include, for example, the motor 48, pulley 52 and belt 54 arrangement of the same type illustrated in FIGS. 1 and 2. The prismatic lens housing 42A is shown rotatably supported in a bearing 44 mounted on a bracket 46A attached to the bottom of a liquid tight container 116 filled with a surrounding liquid medium 104.

The housing 40A for the first lens element 100 is rotatably supported at the oblique face of the housing 42A for the second lens element 102 by a ball bearing arrangement 58 which may be of the same type shown in FIG. 1. A radially extending shaft 118 extends from the housing 42A upon which shaft a bevel gear 120 rotatably is mounted. Attached to the gear 120 through a sleeve 122 is a toothed pulley 124 for rotation of the pulley upon drive rotation of the bevel gear. The bevel gear engages a bevel ring gear 126 attached to the bracket 46A for drive rotation of the gear 120 and attached pulley 124 for drive actuation of the toothed belt 129 extending over the pulley upon rotation of the housing 42A. The belt 129 from the pulley 124 passes over a pair of idler pulleys 130, only one of which is seen in FIG. 4, and engages the housing 40A at a toothed belt groove 132 formed in the periphery thereof. With the proper selection of pulley and gear diameters the prismatic lenses 100 and 102 are driven in opposite rotational directions at the same rotational speeds by the motor 48.

The outer faces 112 and 114 of the identical prismatic lens elements 100 and 102 are provided with the necessary curvature for proper focusing of the incident compressional image field at a location which includes a linear transducer array 34, shown in FIG. 4. Obviously, the inner wedge surfaces may be curved, or all four surfaces may be curved, as desired. Aside from such focusing action, the wedges 100 and 102 serve to up and down scan the compressional image field and provide an image thereof at the array of transducer elements in the same manner described above with reference to the FIGS. 1-3 arrangement employing the plane wedges 16 and 18 upon counterrotation thereof. In FIG. 4, prismatic lens 102 is rotated in one direction about the fixed axis 28, while the lens 100 is rotated in the opposite direction but at the same speed about a movable axis 84. As with the FIGS. 1-3 arrangement, the rotary axis 84 of the first lens 100 nutates (at an angle $\theta$ in the illustrated arrangement) about the fixed axis 28 whereas the incident acoustic wave axis 28B pivots up and down (to a maximum angle of $2\theta$ from the axis 28 in the illustrated arrangement).

It will be apparent that any number of lens or deflecting elements may be included in the assembly. Also, other element configurations may be used. Although a fluid central filler material 22A is required to allow for the changing configuration thereof as the wedges are counter-rotated, solid or fluid material may be employed in the design of lenses, wedges and other fillers. Obviously, stops may be included in the system to further reduce aberration, and lens surfaces may be treated to reduce reflection. Operation of the motor at a non-constant rate also is contemplated to approximate some other deflection rate than the illustrated sinusoidal deflection rate. Other drive mechanisms than those illustrated in FIGS. 1 and 4 also may be used to drive the wedges with the necessary counter rotating movement. In FIG. 5 the use of the novel counterrotating wedge arrangement of this invention for deflecting optical radiation, such as a laser beam 190 from a laser 192 for scanning across a line 194 is shown. The wedges 196 and 198 are mounted for rotation about fixed and nutating axes, respectively, and the mounting and drive mechanisms shown in FIGS. 1 and 4 may be employed for such purpose. Obviously, no rotary seal means between wedges, and no media for the support of electromagnetic radiation are required for operation of the present arrangement. The wedges are shown in a relative rotary position similar to that illustrated in FIG. 3C. Here, compensation for lateral displacement of the beam, is provided by means of a convex outer surface 200 formed on the wedge 198. With a properly curved surface 200 it will be apparent that counter-rotation of the wedges at the same speed serves to move the laser beam up and down along the line 194 without lateral displacement (into and out of the plane of the drawing). In this illustration, line 194 lies in the focal plane of the lens formed by surface 200, so that in addition to correcting for lateral displacement of the laser beam, the beam is also well focused along line 194.

It is intended that the above and other such changes and modifications shall fall within the spirit and scope of the invention as defined in the appended claims.

We claim:

1. A deflection system for deflecting radiation subject to refraction, such as light or sound, comprising,
   first and second radiation refracting wedges in the path of incident radiation through which wedges the radiation is passed,
   means for mounting the second wedge for rotation about a fixed axis of rotation,
   means for mounting the first wedge for rotation about a movable axis which nutates about said fixed axis during rotation of said second wedge, and
   means for counterrotating said wedges at equal angular displacements for control of the deflection of said radiation passing therethrough.

2. The deflection system as defined in claim 1 wherein the fixed axis of rotation of said second wedge and axis of said path of emergent radiation are axially aligned, and the radiation axis of said first wedge is swept through an angle twice the nutational angle of the movable axis of rotation of said first wedge upon counterrotation of the wedges.

3. The deflection system as defined in claim 1 wherein said first and second wedges have generally planar surfaces in which the inner facing surfaces are parallel and outwardly facing surfaces are generally parallel at two opposite rotary positions of the wedges at which the incident radiation is undeflected but laterally is displaced with respect to said fixed axis of rotation of said second wedge.

4. The deflection system as defined in claim 1 wherein the incident radiation face of said first wedge is normal to the incident radiation path and the emergent face of said second wedge is normal to the emergent radiation path whereby incident radiation parallel to the radiation axis of the first wedge is undeflected at the incident and emergent radiation faces of said respective first and second wedges.

5. The deflection system as defined in claim 1 wherein said first and second wedges are spaced apart and radiation traveling along the radiation axis of said first wedge and emerging therefrom passes between said wedges along a path which nutates about said fixed axis of rotation in substantial alignment with the nutating movable axis of said first wedge.

6. The deflection system as defined in claim 5 wherein the radiation axis of said first wedge is swept through twice the nutational angle of the movable axis of rotation thereof upon counter rotation of the wedges.

7. The deflection system as defined in claim 5 for sweeping a compressional acoustic image field past a given line wherein a liquid filler medium is provided in the space between said wedges for support of acoustic radiation passing between said wedges.

8. The deflection system as defined in claim 1 wherein,
   said mounting means for said first and second wedges comprise first and second tubular members for support of said first and second wedges, respectively, in liquid tight engagement therewith,
   said first and second tubular members having parallel facing end walls at an oblique angle with said fixed axis of rotation of said second wedge,
   seal means between said facing end walls to provide a liquid tight cavity between said wedges, and a liquid filler medium within said cavity for the support of acoustic radiation traveling between said wedges.

9. The deflection system as defined in claim 1 wherein the mounting means for the first wedge includes bearing means at an oblique angle to the fixed rotational axis of said second wedge for connecting said first and second wedges.

10. The deflection system as defined in claim 9 wherein said mounting means for said first and second wedges include,
first and second cylindrical tubular members in which said first and second wedges, respectively, are mounted, and which tubular members have facing end walls parallel to the plane of said bearing means.

11. The deflection system as defined in claim 10 including,
seal means between the facing end walls of said tubular members to provide a liquid tight cavity between the wedges, and
liquid filler means within said cavity for support of acoustic radiation therewithin.

12. The deflection system as defined in claim 9 wherein said means for counterrotating said wedges includes,
a shaft carried by the second wedge and extending outwardly from the fixed axis of rotation,
attached drive and driven members rotatably supported on said shaft,
stationary annular means in engagement with said drive member for drive rotation thereof upon rotation of said second wedge, and
means connecting said attached driven member to said first wedge for rotation in an opposite sense and same rate as rotation of said second wedge.

13. The deflection system as defined in claim 1 wherein the radiation is refracted substantially equal amounts at each wedge surface in passing therethrough.

14. The deflection system as defined in claim 1 wherein at least one of said first and second wedges comprises a prismatic lens.

15. The deflection system as defined in claim 1 wherein said first and second wedges comprise prismatic lenses.

16. The deflection system as defined in claim 1 wherein at least one of said first and second wedges is formed with a non-planar surface for the passage of radiation.

17. The deflection system as defined in claim 1 wherein both said first and second wedges are formed with at least one non-planar surface through which radiation passes.

18. A method of deflecting radiation which is subject to refraction, such as light and sound, comprising
directing the radiation through first and second wedges one of which is rotatably mounted for rotation about a fixed axis and the other of which is rotatably mounted for rotation about a movable axis which nutates about said fixed axis, and
rotating the wedges in opposite rotary directions about their respective axes at equal angular displacements, said first wedge being rotated about its movable axis of rotation, and said movable axis being movable through a complete nutational cycle for each complete revolution of the wedges.

19. The deflection method as defined in claim 18 for sweeping a field past a given line once in each direction for each complete revolution of the wedges which includes refracting the field substantially the same amount in the same direction at opposing faces of the first and second wedges at the opposite maximum deflection positions of the wedges.

20. The deflection method as defined in claim 19 for sweeping an acoustic image field past said given line which includes passing the acoustic image field through liquid filler means between said wedges.

21. The deflection method as defined in claim 18 which includes refracting the radiation passing through the wedges substantially equal amounts and in the same direction at each wedge surface through which the radiation passes at opposite maximum deflection positions of the wedges.

22. The deflection method as defined in claim 18 which includes using first and second wedges at least one of which is formed with plane surfaces.

23. The deflection method as defined in claim 18 which includes using first and second wedges at least one of which is formed with non-plano surfaces.

24. The deflection method as defined in claim 18 which includes using first and second wedges at least one of which comprises a prismatic lens.

25. In an acoustic image deflection system for sweeping a compressional acoustic image field past a given line,
first and second acoustic wedges rotatably mounted on movable and fixed axes, respectively, with the fixed axis normal to the given line, and
means for rotating said acoustic wedges in opposite rotational senses at equal angular displacements while nutating said movable axis about said fixed axis such that the acoustic axis extended of said first wedge is swept orthogonally past the given line perpendicular to said fixed axis in a plane containing said fixed axis once in each direction for each full rotation of said acoustic wedges.

26. In an acoustic image deflection system as defined in claim 25 wherein said first and second wedges are spaced apart and have directly opposed surfaces at which the acoustic image field is substantially equally refracted.

27. In an acoustic image deflection system as defined in claim 25 including a liquid filler medium between said wedges for support of said acoustic image field therebetween,
a surrounding liquid filler medium at the outer faces of said wedges, and
means for sealing the fluid filler medium between said wedges to prevent mixing with the surrounding liquid filler medium.

28. In an acoustic image deflection system as defined in claim 27 including first and second tubular cylindrical housing members having oblique parallel facing ends within which members said first and second wedges are mounted,
said sealing means comprising annular seal means between said facing housing member ends to provide a liquid tight seal therebetween.

29. In a deflection system for sweeping a radiation image field passing therethrough past a given line,
a first wedge upon which a radiation image field is incident,
a second wedge from which the radiation image field is emergent, means for rotatably mounting said second wedge for rotation about a fixed axis in alignment with the radiation axis of said second wedge, means for mounting said first wedge for rotation about a movable axis which nutates about said fixed axis, and means for rotating said wedges in opposite rotational senses at equal angular displacements and simultaneously nutating said first wedge axis about said second wedge axis for scanning the incident radiation image field across a given line.

30. In a deflection system as defined in claim 29 wherein said first wedge has a flat outer facing surface upon which the radiation image field is incident and which moves with an oscillatory nodding motion.

31. In a deflection system as defined in claim 29 wherein the radiation axis of said first wedge is swept through an angle which is twice the nutational angle of said movable axis of rotation.

* * * * *